United States Patent [19]
Kim

[11] Patent Number: 6,084,741
[45] Date of Patent: Jul. 4, 2000

[54] METHOD FOR PREVENTING HEAD COLLISION WHEN DETECTION OF SERVO SYNCHRONIZING SIGNALS FAILS

[75] Inventor: Gwan-Il Kim, Seongnam, Rep. of Korea

[73] Assignee: SamSung Electronics Co., Ltd., Suwon, Rep. of Korea

[21] Appl. No.: 09/014,654

[22] Filed: Jan. 28, 1998

[30] Foreign Application Priority Data

Jan. 28, 1997 [KR] Rep. of Korea .......................... 97-2353

[51] Int. Cl.[7] .................................................. G11B 5/596
[52] U.S. Cl. .......................................................... 360/78.04
[58] Field of Search ............................ 360/78.01, 78.04, 360/78.14, 105, 75

[56] References Cited

U.S. PATENT DOCUMENTS

5,109,307  4/1992  Sidman .................................. 360/77.05
5,295,026  3/1994  Chishima ............................... 360/77.08
5,355,260  10/1994  Mikada ..................................... 360/51
5,371,724  12/1994  Uno ........................................... 369/32
5,963,393  10/1999  Rowan et al. ......................... 360/78.06

Primary Examiner—Andrew L. Sniezek
Attorney, Agent, or Firm—Robert E. Bushnell, Esq.

[57] ABSTRACT

A method for preventing a head from colliding with a peripheral mechanical unit when the detection of servo synchronizing signals of a constant number fails. The method includes the steps of: checking whether a servo synchronizing signal is detected; if the servo synchronizing signal is not detected, checking whether the number of undetected servo synchronizing signals exceeds a set value during track search; if the number of undetected servo synchronizing signals exceeds the set value, setting a servo synchronizing signal detection errorbit and servo-controlling the head by using a position estimating value calculated by an estimator algorithm; and if the head is changed to a settling mode while the head is servo-controlled and the servo synchronizing signal detection error bit is set, decelerating and parking the head.

13 Claims, 7 Drawing Sheets

METHOD FOR PREVENTING HEAD COLLISION WHEN DETECTION OF SERVO SYNCHRONIZING SIGNALS FAILS

CLAIM OF PRIORITY

This application makes reference to, incorporates the same herein, and claims all benefits accruing under 35 U.S.C § 119 from an application entitled *Method For Preventing Head Collision When Detection Of Seivo Synchronizing Signal Is Failed* earlier filed in the Korean Industrial Property Office on Jan. 28, 1997, and there duly assigned Ser. No. 97-2353 by that Office.

BACKGROUND OF THE INVENTION

1. Field of the Invention

The present invention relates to a method for preventing a head collision in a magnetic storage device, and more particularly, to a method for preventing a head from colliding with a peripheral mechanical unit when the detection of servo synchronizing signals of a constant number fails.

2. Description of the Related Art

Magnetic storage devices, such as a hard disk drive, a floppy disk drive, etc., have widely been used as an auxiliary storage device of a computer system. The hard disk drive not only stores large amount of data stably but accesses the data at high speed. A hard disk drive has a disk which rotates at high speed by a spindle motor and an actuator arm to which a magnetic head (hereinafter, referred to as the head) for writing or reading data in or from a track of the disk is installed. The actuator arm turns round a pivot axis. A bobbin and a coil installed at one end of the actuator arm move by the operation of a voice coil motor. Then the head, installed on an end of a suspension of the other end of the actuator arm, moves horizontally above the disk, thereby writing or reading data in or from the track. In this case, the head moves while maintaining a minute flying height in response to an air flow generated by the high speed revolution of the disk.

To read and write data, servo control is needed for shifting the head to a target track and following up a center line of the target track within a constant range. Servo information for this servo control is written into the disk by a servo writer while the hard disk drive is fabricated. A method for writing the servo information by using the whole of one surface of the disk is called a dedicated servo method. A method for writing the data and servo information on the same disk surface is called an embedded servo method. Use of both the dedicated and embedded servo methods is discussed in U.S. Pat. No. 5,109,307 to Michael Sidman entitled *Continuous-Plus-Embedded Servo Data Position Control System For Magnetic Disk Device* incorporated herein by reference.

In a system having a disk in which the servo information is written only by the embedded servo method, a servo sector and a data sector are alternatively arranged. The data sector is classified into an identification (ID) area for writing ID information and a data area for writing user data. If a headerless format is utilized, there is no ID area. The servo sector is divided into an automatic gain control (AGC) area, a servo synchronizing signal (SYNC) area, a servo address mark (SAM) area, an index (IDX) area, a gray code area, a servo burst area, and a postamble (PAD) area. The AGC area constantly maintains, throughout the entire disk, time needed to change a data write operation state to a servo information read operation state and the size of a position signal read from the head. The SYNC area provides the synchronization of servo signal detection. In the servo address mark area, a reference pattern of servo timing generation is written. The index area provides one-rotation information of the disk. In the gray code area, address information such as a servo sector, a head, a cylinder number, etc. is written. The servo burst area controls the on-track position of the head.

During track search, in order to accurately read the servo information from the servo sector with the above construction, a servo synchronizing signal should be detected. If the servo synchronizing signal is not normally detected due to a defect of the disk, a damage of a servo synchronizing signal pattern, noise etc., the position information of the head can not be accurately obtained and normal servo control is not performed. Then the hard disk drive counts the number of undetected servo synchronizing signals. If the counted number exceeds a set value, the head is parked to a parking zone.

In a track search mode, a microprocessor for performing the servo control checks whether the servo synchronizing signal is detected. If the servo synchronizing signal is detected, a position error signal (PES) value and a state variable are calculated by using track information and a servo burst signal read through the head. A control output value for servo-controlling the head is supplied to a VCM driver. The microprocessor checks whether a current servo control mode is a settling mode. If yes, the microprocessor checks whether the current servo control mode is an on-track mode. If it is the on-track mode, the number of the undetected servo synchronizing signals is cleared. If the current servo control mode is not the settling mode or if it is the settling mode but not the on-track mode, the microprocessor continuously checks whether the servo synchronizing signal written in the servo sector is detected. If the servo synchronizing signal is not detected, the number of the undetected servo synchronizing signals is counted. The microprocessor checks whether the number of undetected servo synchronizing signals exceeds a set value. If so, the microprocessor sets a servo synchronizing signal detection error bit (hereinafter, referred to as the fail synchronizing bit F-SYNC) and the head is shifted to the parking zone. If the fail synchronizing bit F-SYNC is set while the head is accelerated at high speed, the head is parked under the state that the moving speed of the head is not sufficiently decelerated. Therefore, the head collides with a peripheral mechanical unit such as a crash stopper. Namely, the conventional hard disk drive has a problem in that the head collides with a peripheral mechanical unit if the servo synchronizing signals are not successively detected during the track search.

U.S. Pat. No. 5,355,260 to Masako Mikada entitled *Servo System For Positioning A Read/Write Head Within A Storage Device With Means For Detecting Malfunctions In The Servo Data* contemplates another servo malfunction process in a hard disk drive that stops the operation of the hard disk drive upon detection of a malfunction, however, the Mikada patent does not describe a process of moving the head to a parking area when the operation is stopped.

SUMMARY OF THE INVENTION

An object of the present invention is to provide a method for preventing a head of a magnetic storage device from colliding with a peripheral mechanical unit when the detection of a constant number if servo synchronizing signals fails.

In one aspect of the present invention, a method for preventing head collision in a magnetic storage device utilizing an estimator algorithm includes the steps of: checking whether a servo synchronizing signal is detected; if the servo synchronizing signal is not detected, checking whether the number of undetected servo synchronizing signals exceeds a set value during track search; if the number of undetected servo synchronizing signals exceeds the set value, setting a servo synchronizing signal detection error bit and servo-controlling the head by using an estimating value calculated by the estimator algorithm; and if the head is changed to a settling mode while the head is servo-controlled, parking the head.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
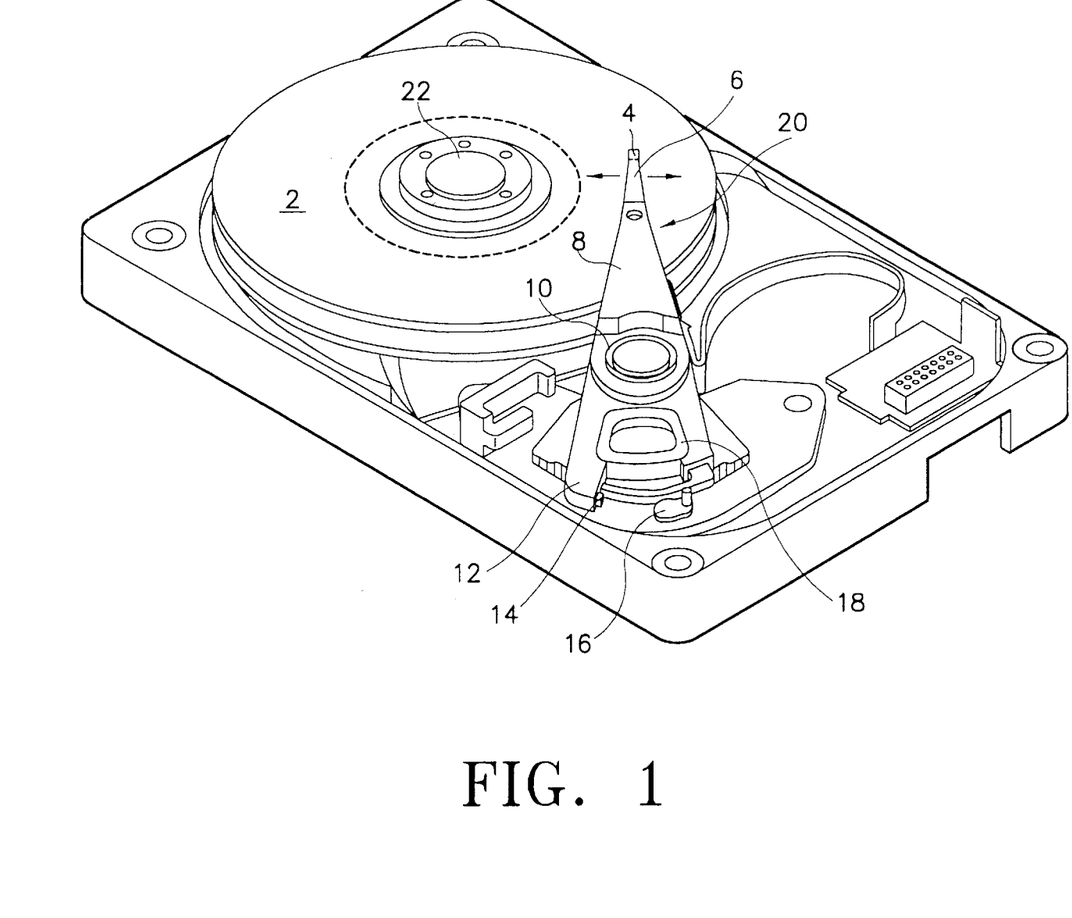
FIG. 1 is a perspective view of a hard disk drive.

As illustrated in FIG. 1, the hard disk drive has a disk 2 which rotates at high speed by a spindle motor 22 and an actuator arm 20 on which a magnetic head 4 (hereinafter, referred to as the head) for writing or reading data in or from a track of disk 2 is installed. The actuator arm 20 turns round a pivot axis 10. A bobbin 12 and a coil installed at one end of the actuator arm 20 move by the operation of a voice coil motor 18. Then head 4 installed on one end of a suspension 6 of the other end of actuator ann 20 moves horizontally above disk 2, thereby writing or reading data in or from the track. In this case, head 4 moves while maintaining a minute flying height in response to an air flow generated by the high speed revolution of disk 2.

To read and write data, servo control is needed for shifting head 4 to a target track and following up a center line of the target track within a constant range. Servo information for this servo control is embedded on disk 2 by a servo writer while the hard disk drive is fabricated. The construction of the servo information will now be described with reference to FIGS. 2A to 2C showing a sector format of the servo information written by the embedded servo method.

Figures 2A, 2B:
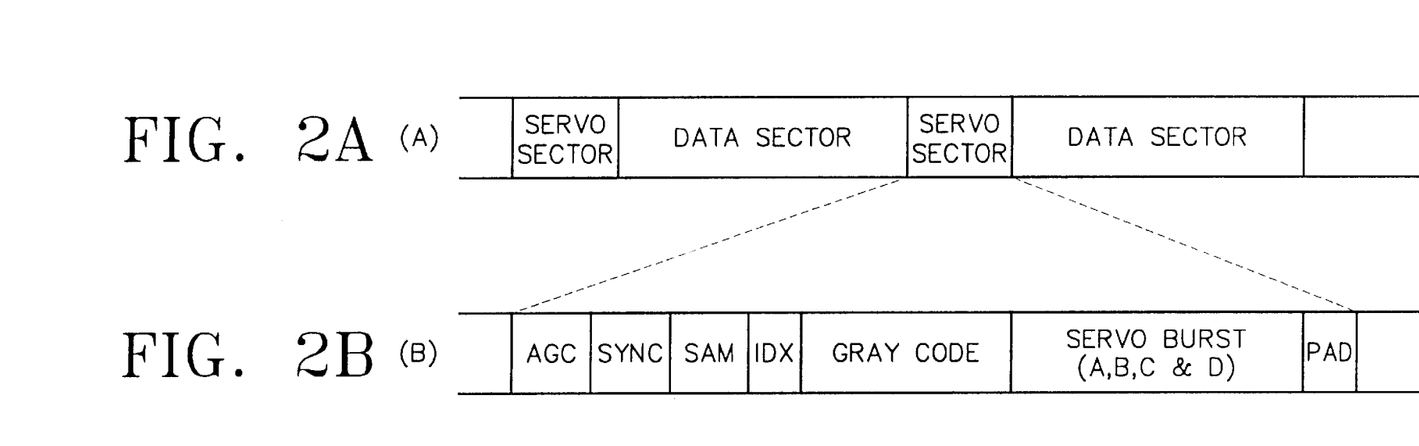
FIGS. 2A to 2C show a sector format of a specific track among tracks arranged in a concentric circle on a disk and a servo synchronizing signal.
Figure 2C:
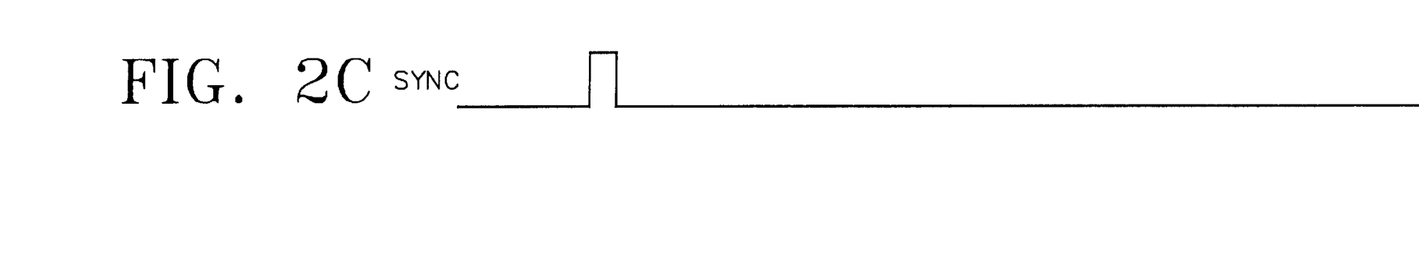

FIGS. 2A to 2C illustrate the sector format of a specific track among tracks arranged in a concentric circle on disk 2. In disk 2 in which the servo information is written by the embedded servo method, a servo sector and a data sector are alternatively arranged as shown in FIG. 2A. The data sector is classified into an identification (ID) area for writing ID information and a data area for writing user data. If a headerless format is utilized, there is no ID area. As indicated in FIG. 2B, the servo sector is divided into an automatic gain control (AGC) area, a servo synchronizing signal SYNC area, a servo address mark (SAM) area, an index (IDX) area, a gray code area, a servo burst area, and a postamble (PAD) area. The AGC area constantly maintains, throughout the entire disk, time needed to change a data write operation state to a servo information read operation state and the size of a position signal read from head 4. The servo synchronizing signal area provides the synchronization of servo signal detection. In the servo address mark area, a reference pattern of servo timing generation is written. The index area provides one-rotation information of the disk. In the gray code area, address information such as a servo sector, a head, a cylinder number, etc. is written. The servo burst (A, B, C and D) area controls the on-track position of the head.

During track search, in order to accurately read the servo information from the servo sector with the above construction, a servo synchronizing signal SYNC should be detected. If the servo synchronizing signal SYNC is not normally detected due to a defect of the disk, damage of a servo synchronizing signal pattern, noise, etc., since the position information of head 4 can not be accurately obtained, the normal servo control is not performed. Then the hard disk drive counts the number of the undetected servo synchronizing signals. If the counted number exceeds a set value, head 4 is parked to a parking zone.

Figure 3:
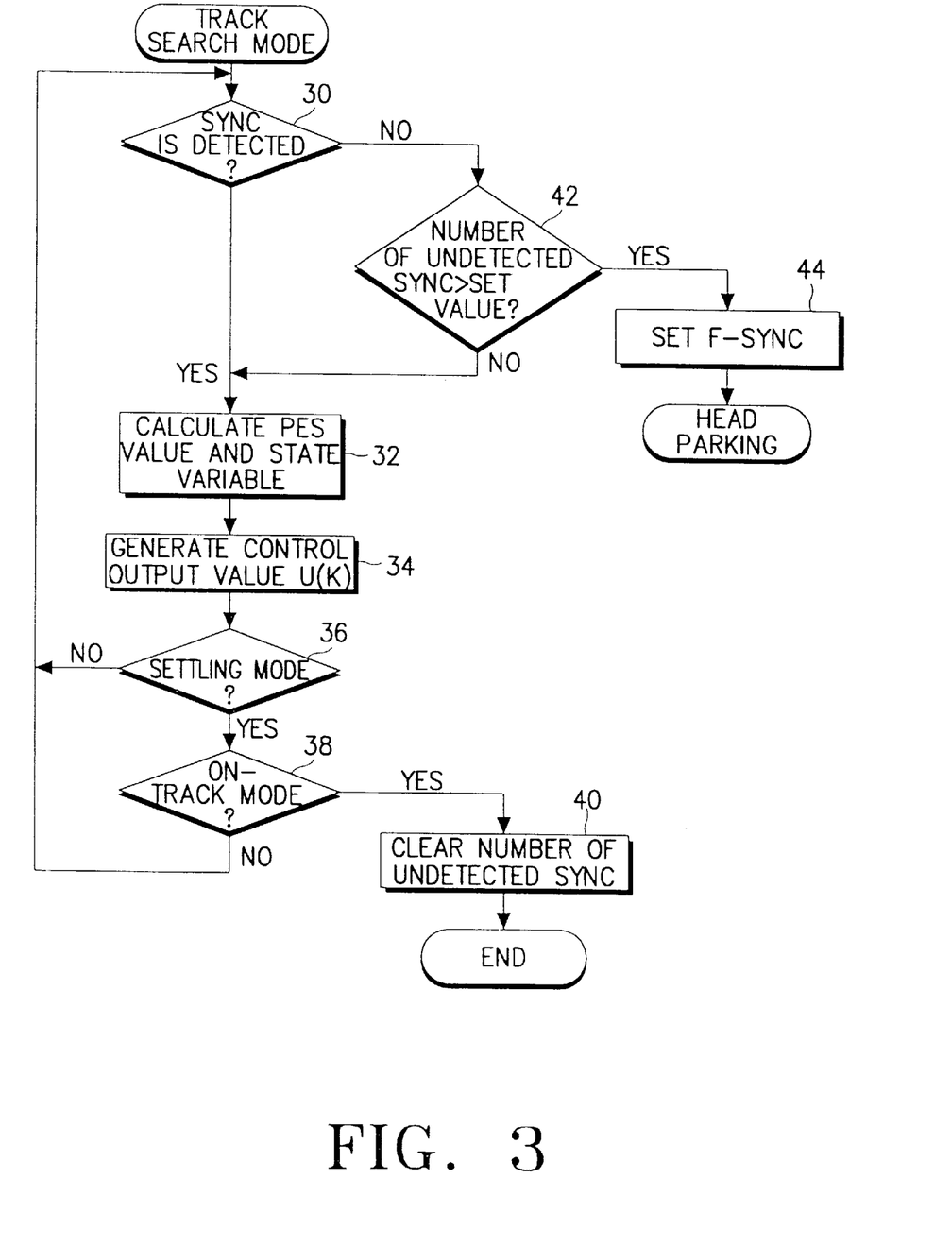
FIG. 3 is a flow chart showing a conventional head parking process when the detection of servo synchronizing signals of a constant number fails.

FIG. 3 shows a head parking process when the detection of the servo synchronizing signals of a constant number fails. In a track search mode, a microprocessor (not shown) for performing the servo control checks whether the servo synchronizing signal is detected at step 30. If the servo synchronizing signal is detected, a position error signal (PES) value and a state variable are calculated by using track information and a servo burst signal read through the head at step 32. At step 34, a control output value U(k) for servo-controlling head 4 is supplied to a VCM driver (not shown). At step 36, the microprocessor checks whether a current servo control mode is a settling mode. If yes, the microprocessor checks, at step 38, whether the current servo control mode is an on-track mode. If it is the on-track mode, the count number of undetected servo synchronizing signals is cleared at step 40. If the current servo control mode is not the settling mode or if it is the settling mode but not the on-track mode, the microprocessor returns to step 30 to continuously check whether the servo synchronizing signal written in the servo sector is detected. If the servo synchronizing signal is not detected at step 30, the count number of the undetected servo synchronizing signals is increased. The microprocessor checks whether the number of the undetected servo synchronizing signals exceeds a set value at step 42. If so, the microprocessor sets the fail synchronizing bit F-SYNC at step 44 and head 4 is then shifted to the parking zone.

Figure 4A:
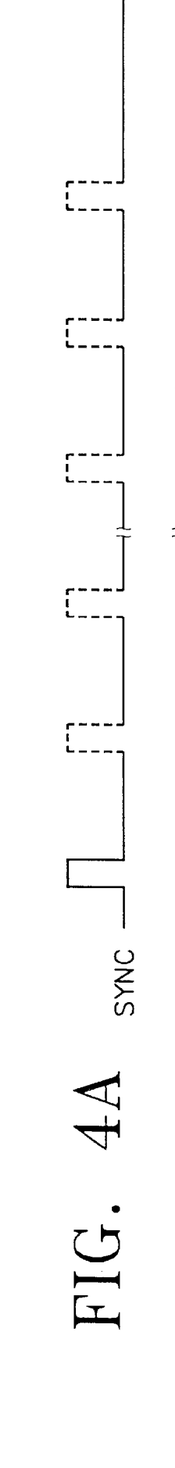
FIGS. 4A to 4D are timing charts of the head parking process of FIG. 3.
Figure 4B:
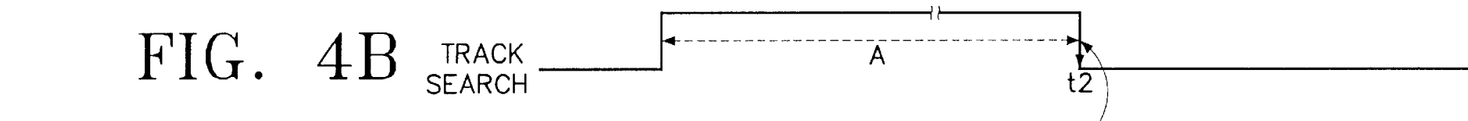
Figure 4C:
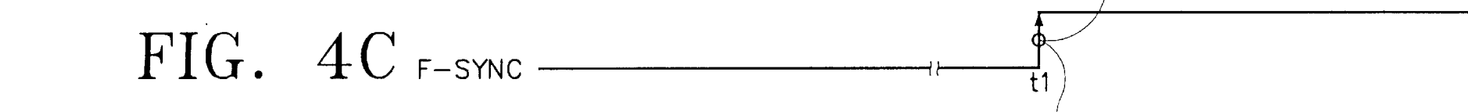
Figure 4D:
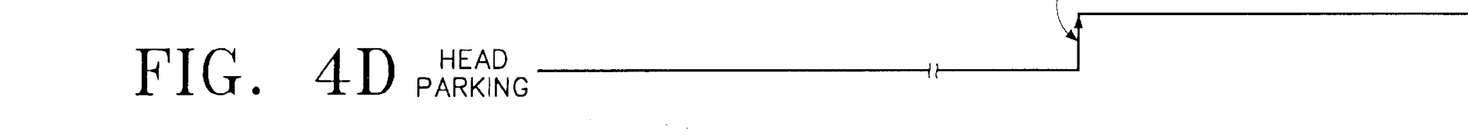

FIGS. 4A to 4D show timing charts of the head parking process when the detection of the servo synchronizing signals of a constant number fails. In FIG. 4A, a solid line shows the servo synchronizing signal which is normally detected from the servo sector. A dashed line indicates the undetected servo synchronizing signals due to the defect of the disk. If the servo synchronizing signals are not successively detected during a track search interval A, the number of the undetected servo synchronizing signals is counted. If the counted number exceeds the set value, the fail synchronizing bit F-SYNC is set at a time t1. At a time t2, the track search is stopped and head 4 is parked. If the fail synchronizing bit F-SYNC is set while head 4 is accelerated at high speed, head 4 is parked under the state that the moving speed of head 4 is not sufficiently decelerated. Therefore, head 4 collides with a peripheral mechanical unit such as a crash stopper. Namely, the conventional hard disk drive has a problem in that the head collides with a peripheral mechanical unit if the servo synchronizing signals are not successively detected during the track search.

Figure 5:
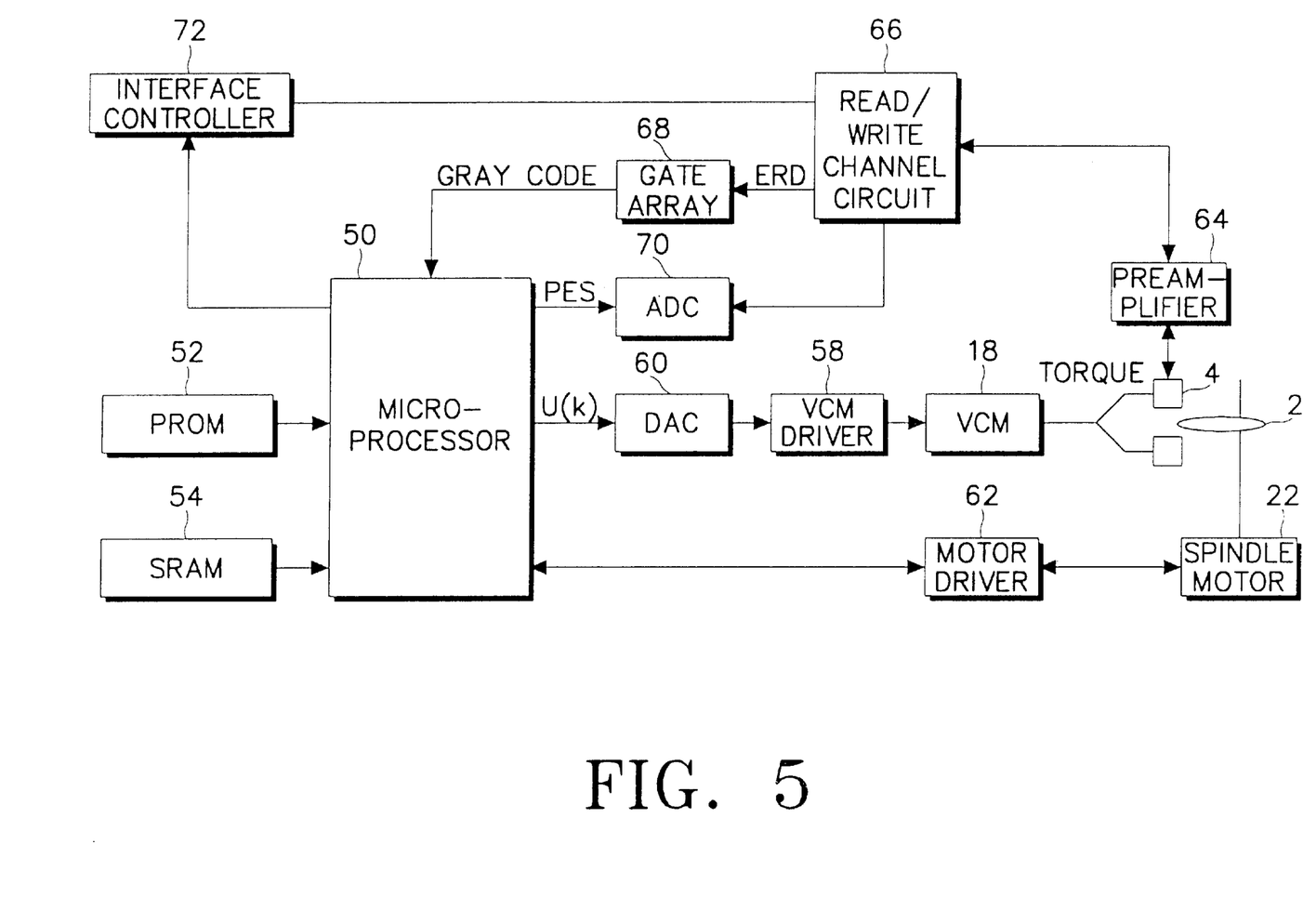
FIG. 5 is a block diagram of the hard disk drive of FIG. 1.

Referring to FIG. 5, a programmable read only memory (PROM) 52 for storing a control program of a microprocessor 50 and an estimator algorithm and a static random access memory (SRAM) 54 are connected to microprocessor 50. Microprocessor 50 implements the overall control operation of the hard disk drive and performs servo control by estimating the position of head 4 when the detection of the servo synchronizing signal SYNC fails. Head 4 installed on one end of the actuator moves horizontally above disk 2 and reads and writes data. Voice coil motor (VCM) 18 situated at the other end of the actuator horizontally shifts head 4 above disk 2 according to a head positioning control signal. A spindle motor 22 rotates disk 2 mounted on a driving axis according to a control signal generated from a motor driver 62. A VCM driver 58 connected to VCM 18 controls the driving of VCM 18. A digital-to-analog converter (DAC) 60 connected between microprocessor 50 and VCM driver 58 converts a digital control input signal U(k) generated from microprocessor 60 into an analog signal and supplies the converted analog signal to VCM driver 58 as the head positioning control signal.

Motor driver 62 connected between spindle motor 22 and microprocessor 50 controls the driving of spindle motor 22 by the control of microprocessor 50. A preamplifier 64 connected to head 4 amplifies a reading signal and supplies a writing input signal to head 4. A read/write channel circuit 66 connected to preamplifier 64 and an interface controller 72 encodes writing data generated from interface controller 72 by the control of microprocessor 50 and supplies the encoded data to preamplifier 64. The read/write channel circuit 66 also converts an analog reading signal generated from preamplifier 64 into digital data and generates the converted digital data as encoded read data ERD. An analog-to-digital converter (ADC) 70 connected to read/write channel circuit 66 converts an analog servo reading signal into a position error signal PES and supplies the PES to microprocessor 50. A gate array 68 connected to read/write channel circuit 66 receives the encoded read data ERD and detects servo information such as a gray code within a servo area of disk 2 from the encoded read data ERD. Interface controller 72 transmits and receives data between an external data input device (for example, a host computer) and disk 2.

Figure 6:
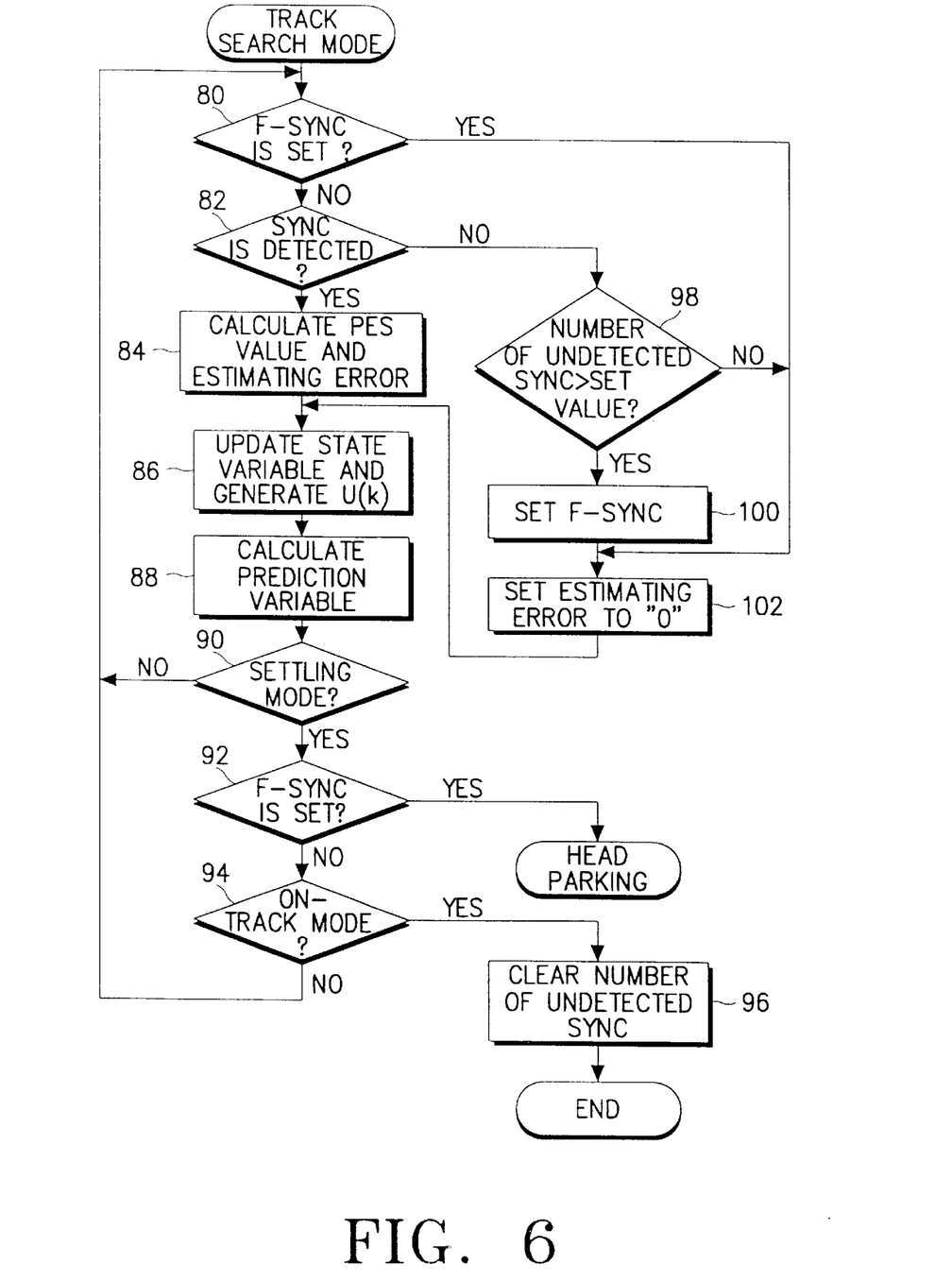
FIG. 6 is a flow chart showing a head parking process for preventing a head from colliding according to the principles of the present invention.

FIG. 6 illustrates a head parking process for preventing the head from colliding with a peripheral mechanical unit such as a crash stopper when the detection of the servo synchronizing signals fails a predetermined number of times.

In a track search mode, microprocessor 50 performs servo control checks and at step 80, determines whether the fail synchronizing bit F-SYNC is set. If the fail synchronizing bit F-SYNC is not set, microprocessor 50 checks, at step 82, whether the servo synchronizing signal SYNC is detected. If the servo synchronizing signal SYNC is detected, the position error signal (PES) value and an estimating error are calculated by using the track information and servo burst signal read through head 4 at step 84. The PES value is derived from a burst signal out of the servo control signals written on the disk for controlling the position of the head. The estimating error is calculated by the estimator algorithm during the track search, and compared with a predetermined error value to check whether or not the estimating error falls within a permissible error value. At step 86, a state variable is updated and the control output value U(k) for servo-controlling head 4 is generated. The state variable is a variable used by the estimator and is the latest information indicative of the drive status calculated by the estimator using previous servo information. At step 88, a prediction variable is calculated. Once the state variable is determined, a state variable at the next sampling can be estimated by using the current initial value of the state variable and the previous control output value U(k). Such an estimated value is called the prediction variable. By using the prediction variable, the settling mode for safely settling the head can be performed upon detection of the fail synchronizing bit F-SYNC. At step 90, microprocessor 90 checks whether a current servo control mode is the settling mode. If it is not the settling mode, step 90 is followed by step 80. If it is the settling mode, microprocessor 50 checks whether the fail synchronizing bit F-SYNC is set at step 92. If the fail synchronizing bit F-SYNC is not set, microprocessor 50 checks, at step 94, whether the current servo control mode is the on-track mode. If not, step 94 returns to step 80. If the current servo control mode is the on-track mode in step 94, a counted number of undetected servo synchronizing signals is cleared from microprocessor 50 at step 96. Consequently, if the servo synchronizing signal SYNC is normally detected in the track search mode, microprocessor 50 continues to control head 4 to write or read data on or from a data sector of disk 2.

Figure 7A:
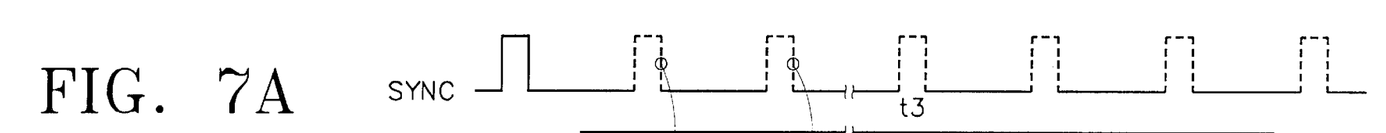
FIGS. 7A to 7F are timing charts of the head parking process of FIG. 6.
Figures 7B, 7C, 7D:
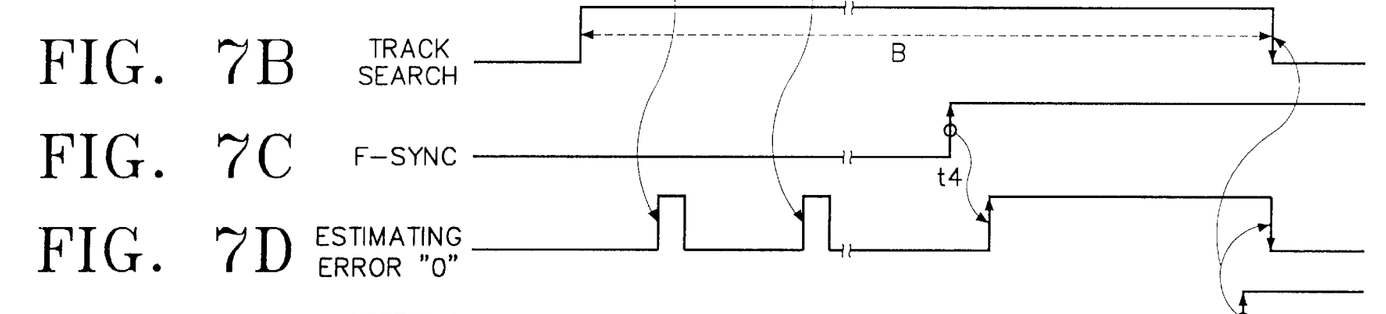

FIG. 6 will now be further described with reference to FIGS. 7A–7F. The head parking process in the case that the detection of the servo synchronizing signals fails will now be described. In FIG. 7A, a solid line shows the normally detected servo synchronizing signal SYNC. A dashed line indicates the undetected servo synchronizing signals by the defect of the disk. As indicated in FIG. 7A, if the detection of the servo synchronizing signals fails during a track search interval B shown in FIG. 7B, microprocessor 50 counts the number of undetected servo synchronizing signals. At step 98 in FIG. 6, microprocessor checks whether the counted number of undetected servo synchronizing signals exceeds a set value. The set value is previously set so that the fail synchronizing bit F-SYNC will be set (FIG. 7C) in step 100 when the detection of the servo synchronizing signals fails a predetermined number of times and then the estimating error is set to "0" (FIG. 7D) at step 102. Step 98 is immediately followed by step 102 if the undetected number of servo synchronizing signals does not exceed the set value, and the estimating error is set to "0". The "estimating error" means a difference between an estimated value of the current position of head 4 calculated by the estimator algorithm and an actual position value of head 4 received from ADC 70. Step 102 is followed by step 86 to update the state variable and generate the control output value U(k). In steps 84–88, if the servo synchronizing signal is normally detected, microprocessor 50 calculates the information to be used to control the head after the on-track mode. However, if the servo synchronizing signal is not detected, microprocessor 50 sets the estimating error of the head to "0" and forcibly performs a normal operation in order to park the head in a stable state. The estimating error is set to "0" in step 102 to keep the track search by disregarding the track search fail state. The state variable for the latest drive state is updated in step 86 to suppose the track search state by using the estimator.

If the fail synchronizing bit F-SYNC is determined to have been set in step 80 or if the number of the undetected servo synchronizing signals exceeds the set value at a time t3 as shown in FIG. 7A (this state is defined as a servo synchronizing signal detection error state) thus setting the fail synchronizing bit F-SYNC at a time t4 (FIG. 7C) at step 100, then at step 102, the estimating error is set to "0" (FIG. 7D) until the track search interval (FIG. 7B) is ended. Microprocessor 50 continues to implement the track search by using the estimating value calculated by the estimator algorithm. Therefore, head 4 can approximate to an actual target track by the estimating value. When F-SYNC is set, head 4 is decelerated for entering the settling mode as shown in FIG. 7E.

Figures 7E, 7F:
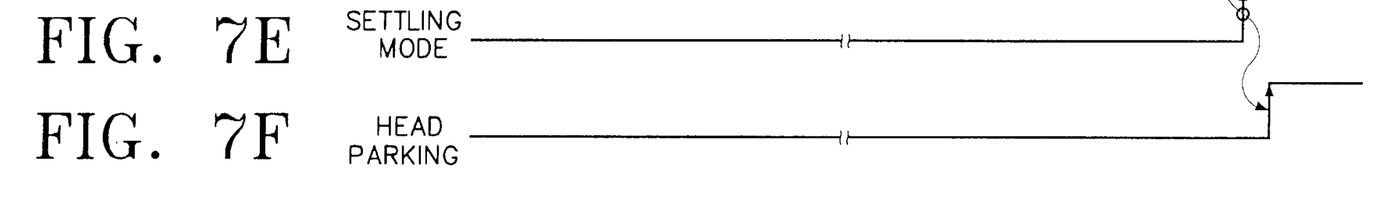

Meanwhile, when the fail synchronizing bit F-SYNC is detected at step 92, the track search is stopped and head 4 is parked as shown in FIG. 7F. That is, since the head 4 is parked under the state that the moving speed of the head 4 is sufficiently decelerated, the head 4 can be safely parked without colliding with the peripheral mechanical unit. The servo synchronizing signal detection error bit, i.e., fail synchronizing bit F-SYNC, is then reset once the head is parked.

As described above, if the number of the undetected servo synchronizing signals exceeds the set value, the head is servo-controlled by using the estimating value calculated by the estimator algorithm. The head can be prevented from colliding with the peripheral mechanical unit by shifting the head to the parking zone under the state that the moving speed of the head is decelerated during the servo control.

While the present invention has been shown and described with reference to a certain preferred embodiment thereof, it will be understood by those skilled in the art that various changes in form and details may be made therein without departing from the spirit and scope of the present invention as defined by the appended claims.

What is claimed is:

1. A method for preventing head collision in a magnetic storage device, said method comprising the steps of:

utilizing an estimator algorithm for calculating an estimated value of a current position of a head in said magnetic storage device;

checking, during a track search mode, whether a servo synchronizing signal is detected;

determining whether a counted number of undetected servo synchronizing signals exceeds a set value when said servo synchronizing signal is not detected;

setting a servo synchronizing signal detection error bit and servo-controlling a head by using said estimated value calculated by said estimator algorithm, when said counted number of undetected servo synchronizing signals exceeds said set value; and decelerating said head in a settling mode and then parking said head.

2. A method for preventing head collision in a hard disk drive, said method comprising the steps of:

utilizing an estimator algorithm for calculating an estimated value of a current position of a head in said hard disk drive and for calculating an estimating error according to a difference between the estimated value of the current position of the head and an actual position value of the head;

checking whether a number of undetected servo synchronizing signals exceeds a set value during a track search mode;

setting a servo synchronizing signal detection error bit when it is determined that said number of undetected servo synchronizing signals exceeds said set value;

servo-controlling a head by using said estimating value calculated by said estimator algorithm;

determining whether a current servo control mode is a settling mode;

determining whether said servo synchronizing signal detection error bit is set when it is determined that said current servo control mode is said settling mode;

decelerating said head and then parking said head when it is determined that said servo synchronizing signal detection error bit is set.

3. The method as claimed in claim 2, further comprising a step of setting the estimating error to zero after said servo synchronizing signal detection error bit is set.

4. The method as claimed in claim 2, further comprising a step of resetting said servo synchronizing signal detection error bit after said head is parked.

5. The method as claimed in claim 2, further comprising a steps of determining whether said current servo control mode is an on-track mode when it is determined that said servo synchronizing signal detection error bit is not set.

6. The method as claimed in claim 2, further comprising a step of determining whether said servo synchronizing signal detection error bit is set as a first step in said track search mode and then performing said step of checking whether a number of undetected servo synchronizing signals exceeds said set value when it is determined that said servo synchronizing signal detection error bit is not set.

7. The method as claimed in claim 6, further comprising the steps of:

determining whether said current servo control mode is an on-track mode when it is determined that said servo synchronizing signal detection error bit is not set after determining said current servo control mode is said settling mode; and returning to said first step of said track search mode to again determine whether said servo synchronizing signal detection error bit is set, when it is determined that said current servo control mode is not said on-track mode.

8. The method as claimed in claim 6, further comprising a step of returning to said first step of said track search mode to again determine whether said servo synchronizing signal detection error bit is set when it is determined that said current servo control mode is not said settling mode.

9. A method for preventing head collision during a track search mode in a hard disk drive, said method comprising the steps of:

utilizing an estimator algorithm for calculating an estimated value of a current position of a head in said hard disk drive and for calculating an estimating error according to a difference between the estimated value of the current position of the head and an actual position value of the head;

determining whether a fail synchronizing bit is set;

determining whether a servo synchronizing signal is detected when it is determined that said fail synchronizing bit is not set;

increasing a count value in a microprocessor when it is determined that said servo synchronizing signal is not detected;

checking whether said count value is greater than a set value after said increasing step;

setting said fail synchronizing bit when it is determined that said count value is greater than said set value;

servo-controlling a head by using said estimating value calculated by said estimator algorithm when it is determined that said servo synchronizing signal is not detected or after said fail synchronizing bit is set;

determining whether a current servo control mode is a settling mode;

checking whether said fail synchronizing bit is set when it is determined that said current servo control mode is said settling mode;

decelerating said head and then parking said head when it is determined by said checking step that said servo synchronizing signal detection error bit is set.

10. The method as claimed in claim 9, further comprising a step of setting estimating error value to zero upon setting said fail synchronizing bit, upon the initial determination that said fail synchronizing bit is set or upon determining that said count value is not greater than said set value.

11. The method as claimed in claim 9, further comprising a step of resetting said fail synchronizing bit after said head is parked.

12. The method as claimed in claim 9, further comprising a step of determining whether said current servo control mode is an on-track mode when it is determined during said checking step that said fail synchronizing error bit is not set.

13. The method as claimed in claim 12, further comprising the steps of:

returning to said step of determining whether said fail synchronizing bit is set, when it is determined that said current servo control mode is not said settling mode or said on-track mode.

* * * * *